BEST AVAILABLE COPY

T856,005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 5, 1968

856 O.G. 4

594,364

PURIFICATION OF RECYCLE METHYLENE CHLORIDE EMPLOYED IN INTERFACIAL POLYMERIZATION PROCESSES

Arthur Nersasian, Wilmington, Del., and Robert Paul Madrulli, Beaumont, Tex., assignors to E. I. du Pont de Nemours and Company, Wilmington, Del., a corporation of Delaware Filed Nov. 15, 1966. Published Nov. 5, 1968
Class 260—77.5
No Drawing. 7 Pages Specification In a process of preparing polyurethanes, polyamides and polyureas by reacting a bischloroformate with a diamine by interfacial polymerization, using methylene chloride as the organic solvent phase and sodium carbonate solution as the aqueous phase, the improvement comprising steam-distilling the reaction mixture to remove methylene chloride, decanting the methylene chloride distillate from the water distillate, treating the methylene chloride distillate with solid soda-lime to remove carbon dioxide and water, and thereafter returning the treated methylene chloride to the process for re-use. The process can be conducted continuously.

This treatment of recycled methylene chloride removes dissolved $CO_2$ to maintain (1) a desired rate of polymerization and (2) an acceptable quality of polymer. The presence of $CO_2$ in the recycled methylene chloride reduces the amount of effective base in the polymerization process and lowers the molecular weight of the polymer product.

Other organic bases which can be used include alkali metal and alkaline earth hydroxides and alkali metal carbonates...